US006940661B2

(12) United States Patent
Chen

(10) Patent No.: US 6,940,661 B2
(45) Date of Patent: Sep. 6, 2005

(54) LENS ASSEMBLY OF CAMERA

(75) Inventor: Tien-Ching Chen, Taichung (TW)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 357 days.

(21) Appl. No.: 10/097,248

(22) Filed: Mar. 15, 2002

(65) Prior Publication Data

US 2003/0142415 A1 Jul. 31, 2003
US 2005/0024747 A2 Jul. 31, 2003

(30) Foreign Application Priority Data

Jan. 22, 2002 (CN) .................................... 02218572 U

(51) Int. Cl.[7] .......................... G02B 13/20; G02B 9/60; G02B 15/14

(52) U.S. Cl. ....................... 359/770; 359/761; 359/754; 359/680

(58) Field of Search ................................ 359/770, 761, 359/754, 757, 756, 680, 676, 682, 714, 708, 659, 656

(56) References Cited

U.S. PATENT DOCUMENTS 6,094,312 A * 7/2000 Nakayama .................. 359/676

* cited by examiner

*Primary Examiner*—Timothy Thompson
(74) *Attorney, Agent, or Firm*—Browdy and Neimark P.L.L.C.

(57) ABSTRACT

A lens assembly, which is mounted on a digital still camera (DSC), comprises a fixed aperture, and a lens unit. The lens unit has a first lens, a second lens, a third lens, a fourth lens and a fifth lens in sequence. The first lens is a biconvex lens disposed at the front side of the lens unit. The second lens is a biconcave lens. The third lens is a positive lens with having a larger curvature radius facing the objective side. The fourth lens is a negative meniscus lens. The fifth lens is a positive lens with a surface having a larger curvature radius facing the image side. The fourth lens and the fifth lens are attached together to form a compound lens. The aperture is disposed in front of the first lens.

2 Claims, 2 Drawing Sheets

LENS ASSEMBLY OF CAMERA

FIELD OF THE INVENTION

The present invention relates to a camera lens for a camera of fixed focal length and, more specifically, to a lens assembly for use in a digital still camera or PC camera.

BACKGROUND OF THE INVENTION

Following fast development of personal computer technology, a variety of digital still cameras (DSC) have been disclosed for use with personal computers, and intensively used in families. A regular digital still camera uses a solid state image pickup device such as, charge-coupled device (CCD) or complementary metal-oxide semiconductor (CMOS), to pick up the image of an object, enabling the image thus obtained to be transferred through a data line to a personal computer, which uses a software program to convert the image into a JPEG, GIF (graphics interchange format), or TIFF (tagged image file format) file. In order to meet the tendency of the designing of digital still cameras toward microminiaturization, matching solid-state image pickup devices and related lenses are required to be as small as possible, i.e., the dimensions of the solid-state image pickup devices and the length of the lenses must be minimized. When minimizing the dimensions of a solid-state image pickup device, the overall length of the camera lens must be relatively shortened. According to conventional designs, a camera lens is comprised of a number of lenses axially aligned in a line, and an aperture arranged in between two of the lenses. Because the aperture is spaced between two lenses, the total distance of the camera lens cannot be shorted to the desired level. Furthermore, because a big number of lenses are used, the cost of the camera lens is high.

SUMMARY OF THE INVENTION

The present invention has been accomplished to provide a lens assembly, which has a simple structure and compact size. The arrangement of the lens unit greatly reduces the optical distortion, improving the image quality.

According to the primary objective as described above, the lens assembly comprises a fixed aperture, and a lens unit. The lens unit has a first lens, a second lens, a third lens, a fourth lens and a fifth lens in sequence. The first lens is a biconvex lens disposed at the front side of the lens unit. The second lens is a biconcave lens. The third lens is a positive lens with a surface of facing the objective side having a curvature radius larger than the curvature radius of the opposite surface. The fourth lens is a negative meniscus lens. The fifth lens is a positive lens with a surface of facing the image side having a curvature radius larger than the curvature radius of the opposite surface. The fourth lens and the fifth lens are attached together to form a compound lens. The aperture is disposed in front of the first lens.

The lens unit of the lens assembly has the conditions as described hereunder:

$$0.45 < f1/f < 0.9 \quad (1)$$

$$-0.75 < f2/f2 < -0.3 \quad (2)$$

$$12 < f5/f < 20 \quad (3)$$

Wherein, f1 is the focal length of the first lens, f2 is the focal length of the second lens, f5 is the focal length of the fifth lens and f is the total focal length of the lens unit.

The lens unit of the lens assembly has the conditions as described hereunder:

| curvature radius (mm) | | central thickness of lens/interval | index of refraction | dispersion confident | Diameter (mm) |
|---|---|---|---|---|---|
| objective | infinity | infinity | | | |
| aperture | infinity | 0.1 | | | 3.209208 |
| R1 | 5.90278 | 1.926396 | 1.8042 | 46.5 | 3.569826 |
| R2 | −40.63397 | 0.7110201 | | | 3.837362 |
| R3 | −7.508348 | 0.5 | 1.69895 | 30.049999 | 3.947986 |
| R4 | 6.090985 | 0.5541797 | | | 4.361423 |
| R5 | −16.46019 | 2.186299 | 1.83400 | 37.34 | 4.369393 |
| R6 | −6.182094 | 0.1 | | | 5.83058 |
| R7 | 15.12758 | 0.5 | 1.74077 | 27.76 | 6.790118 |
| R8 | 4.547197 | 3.311205 | | | 7.191766 |
| R9 | 4.547197 | 0 | 1.79950 | 42.34 | 7.191766 |
| R10 | 125.0195 | 4.62589 | | | 7.364071 |

DETAILED DESCRIPTION OF THE PREFERRED EMBODIMENT

Figure 1:
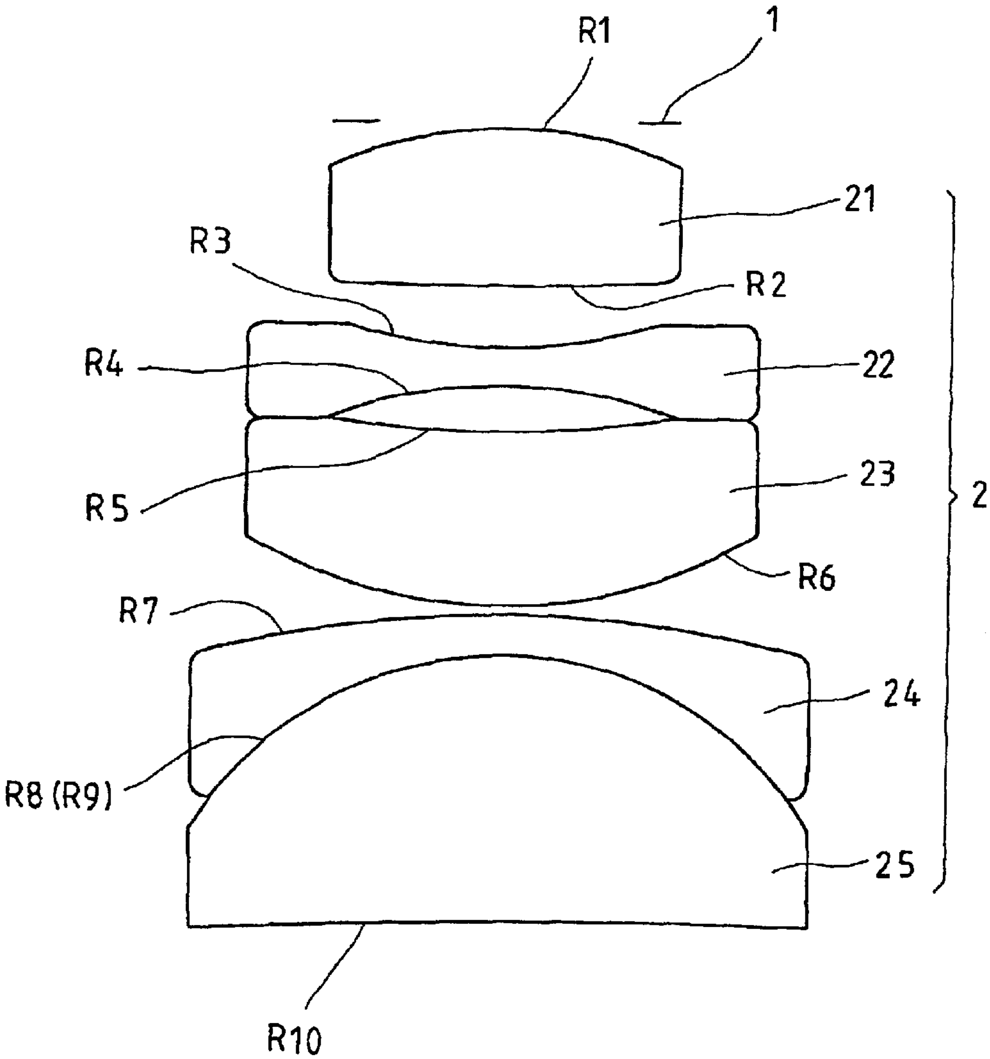
FIG. 1 is a schematic drawing, showing the arrangement of a lens assembly constructed of a first prefer embodiment of the present invention.

Referring to FIG. 1, a lens assembly of the prefer embodiment of the present invention is to be used in a digital still camera or the like, which comprises a fixed aperture 1, and a lens unit 2. The lens unit 2 has a first lens 21, a second lens 22, a third lens 23, a fourth lens 24 and a fifth lens 25 in sequence. The first lens 21 is a biconvex lens disposed at the front side of the lens unit 1. The second lens 22 is a biconcave lens. The third lens 23 is a positive lens with a surface of facing the objective side having a curvature radius R5 larger than the curvature radius R6 of the opposite surface.

The fourth lens 24 is a negative meniscus lens. The fifth lens 25 is a positive lens with a surface of facing the image side having a curvature radius R10 larger than the curvature radius R9 of the opposite surface. The fourth lens 24 and the fifth lens 25 are attached together to form a compound lens. The aperture 1 is disposed in front of the first lens 21.

Figure 2:
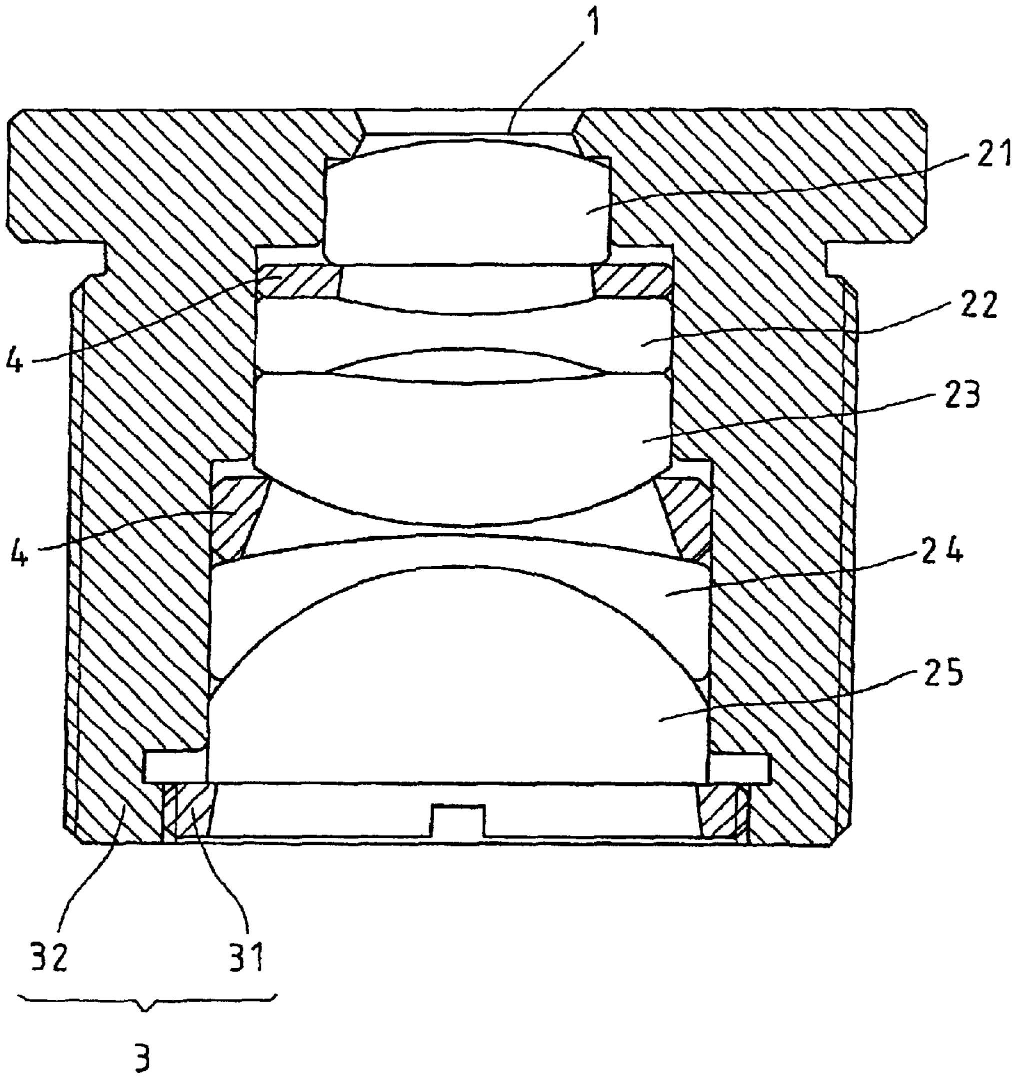
FIG. 2 is a schematic drawing, showing the lens assembly of the prefer embodiment of the present invention installed in a digital still camera.

Referring to FIG. 2, the lens assembly of the present invention is installed in the lens bolder 3 of a digital still camera (not shown). The lens holder 3 has a cover 31 with a barrel 32 capped in the cover 31, and spacer 4 mounted inside the barrel 32 to hold the lens unit 2 in position.

The lenses 21 to 25 of the lens unit 1 constructed under the conditions as described hereunder:

$$0.45<f1/f<0.9 \quad (1)$$

$$-0.75<f2/f<-0.3 \quad (2)$$

$$12<f5/f<20 \quad (3)$$

Wherein, f1 is the focal length of the first lens 21, f2 is the focal length of the second lens 22, f5 is the focal length of the fifth lens 22 and f is the total focal length of the lens unit 2.

Hereunder I will present the exact data of the lens assembly, wherein the focal length of the lens unit is 9.049967 mm and the height of the image is 8.52687 mm. The lens assembly of the present invention fits the conditions as shown in the table hereunder:

| curvature radius (mm) | | central thickness of lens/interval | index of refraction | dispersion confident | diameter (mm) |
|---|---|---|---|---|---|
| objective | infinity | Infinity | | | |
| aperture | infinity | 0.1 | | | 3.209208 |
| R1 | 5.90278 | 1.926396 | 1.8042 | 46.5 | 3.569826 |
| R2 | −40.63397 | 0.7110201 | | | 3.837362 |
| R3 | −7.508348 | 0.5 | 1.69895 | 30.049999 | 3.947986 |
| R4 | 6.090985 | 0.5541797 | | | 4.361423 |
| R5 | −16.46019 | 2.186299 | 1.83400 | 37.34 | 4.369393 |
| R6 | −6.182094 | 0.1 | | | 5.83058 |
| R7 | 15.12758 | 0.5 | 1.74077 | 27.76 | 6.790118 |
| R8 | 4.547197 | 3.311205 | | | 7.191766 |
| R9 | 4.547197 | 0 | 1.79950 | 42.34 | 7.191766 |
| R10 | 125.0195 | 4.62589 | | | 7.364071 |

In conclusion, the aperture 1 mounted at front side of the lens unit 2 will make the lens assembly of the present invention having a simple structure and compact size. The arrangement of the lens assembly greatly reduces the optical distortion, improving the image quality. When used with a CMOS type solid-state image pickup device, the camera cost can be greatly reduced. This design of lens assembly is suitable for use in small digital imaging products such as digital still cameras, and PC cameras.

What is claimed is:

1. A lens assembly, comprising an aperture, and a lens unit having a first lens, a second lens, a third lens, a fourth lens and a fifth lens arranged behind said aperture in sequence, said first lens being a biconvex lens disposed at the front side of the lens unit, said second lens being a biconcave lens, said third lens being positive lens with a surface of facing the image side having a curvature radius larger than the curvature radius of the opposite surface, said fourth lens being a negative meniscus lens and said fifth lens being a positive lens with a surface of facing the image side having a curvature radius larger than the curvature radius of the opposite surface; said fourth lens and said fifth lens being attached together to form a compound lens, said aperture disposed in front of said first lens;

wherein said lens unit of said lens assembly has conditions as described hereunder:

$$0.45<f1/f<0.9 \quad (1)$$

$$-0.75<f2/f<-0.3 \quad (2)$$

$$12<f5/f<20 \quad (3);$$

wherein f1 is the focal length of said first lens, f2 is the focal length of the second lens, f5 is the focal length of said fifth lens and f is the total focal length of said lens unit.

2. A lens assembly, comprising an aperture, and a lens unit having a first lens, a second lens, a third lens, a fourth lens and a fifth lens arranged behind said aperture in sequence, said first lens being a biconvex lens disposed at the front side of the lens unit, said second lens being a biconcave lens, said third lens being positive lens with a surface of facing the image side having a curvature radius larger than the curvature radius of the opposite surface, said fourth lens being a negative meniscus lens and said fifth lens being a positive lens with a surface of facing the image side having a curvature radius larger than the curvature radius of the opposite surface; said fourth lens and said fifth lens being attached together to form a compound lens, said aperture disposed in front of said first lens;

wherein said aperture comprises a curvature radius of infinity and a diameter of 3.209208 mm; said first lens comprises a curvature radius R1 of 5.90278 mm, a central thickness of lens/interval of 1.926396 mm, an index of refraction of 1.8042, a dispersion confident of 46.5, and a diameter of 3.569826 mm, said first lens having the other curvature radius R2 of −40.63397 mm, the other central thickness of lens/interval of 0.7110201 mm, the other diameter of 3.837362 mm; said second lens comprises a curvature radius R3 of −7.508348 mm, a central thickness of lens/interval of 0.5 mm, an index of refraction of 1.69895, a dispersion confident of 30.049999, and a diameter of 3.947986 mm, said second lens having the other curvature radius R4 of 6.090985 mm, the other central thickness of lens/interval of 0.5541797 mm, the other diameter of 4.361423 mm; said third lens comprises a curvature radius R5 of −16.46019 mm, a central thickness of lens/interval of 2.186299 mm, an index of refraction of 1.83400, a dispersion confident of 37.34, and a diameter of 4.369393 mm, said third lens having the other curvature radius R6 of −6.182094 mm, the other central thickness of lens/interval of 0.1 mm, the other diameter of 5.83058 mm; said fourth lens comprises a curvature radius R7 of 15.12758 mm, a central thickness of lens/interval of 0.5 mm, an index of refraction of 1.74077, a dispersion confident of 27.76, and a diameter of 6.790118 mm, said fourth lens having the other curvature radius R8 of 4.547197 mm, the other central thickness of lens/interval of 3.311205 mm, the other diameter of 7.191766 mm; said fifth lens comprises a curvature radius R9 of 4.547197 mm, a central thickness of lens/interval of 0 mm, an index of refraction of 1.79950, a dispersion confident of 42.34, and a diameter of 7.191766 mm, said fifth lens having the other curvature radius R10 of 125.0195 mm, the other central thickness of lens/interval of 4.62589 mm, the other diameter of 7.364071 mm.

* * * * *